United States Patent
Darcy

(10) Patent No.: US 7,526,752 B1
(45) Date of Patent: *Apr. 28, 2009

(54) INTROSPECTION SUPPORT FOR GENERIC TYPES

(75) Inventor: Joseph D. Darcy, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 702 days.

This patent is subject to a terminal disclaimer.

(21) Appl. No.: 11/105,116

(22) Filed: Apr. 12, 2005

(51) Int. Cl.
G06F 9/44 (2006.01)
(52) U.S. Cl. .................... 717/107; 717/117; 717/118
(58) Field of Classification Search ......... 717/106–108, 717/114–118, 131–133
See application file for complete search history.

(56) References Cited

U.S. PATENT DOCUMENTS

2007/0006141 A1* 1/2007 Bracha et al. ............... 717/108

OTHER PUBLICATIONS

Eugster, "Dynamic Proxies for Classes: Towards Type-Safe and Decoupled Remote Object Interaction", 2003, Inforscience, France, pp. 1-18.*
Chandra Hundigam, "Understanding the Generic Type in C#", Sep. 2002, The Code Project, pp. 1-4.*
European Patent Office, "Extended European Search Report," App. No. 06253190.0, dated Jan. 22, 2007, 8 pages.
Sun Microsystems, "Java.Lang Class Class <T>", located on the internet at <http://java.sun.com/j2se/1.5.0/docs/api/java/lang/Class.html, retrieved on Dec. 20, 006, XP002412532, 12 pages.
Sun Microsystems, "Dynamic Proxy Classes," retrieved from the internet at <http://java.sun.com/j2se/1.3/docs/guide/reflection/proxy/html, retrieved on Jan. 3, 2007, XP002412534, 6 pages.
Sun Microsystems, "Java.lang.reflect Class Proxy," retrieved from the internet at http://java.sun.com/j2se/1.5/docs/api/java/lang/reflect/Proxy.html, retrieved on Dec. 20, 2006, XP002412533, 5 pages.
Bracha, Gilad, "Generics in the Java Programming Language," [online], Jul. 5, 2004, [retrieved on Jun. 14, 2005]. Retrieved from the Internet: <http://java.sun.com/j2se/1.5/pdf/generics-tutorial.pdf>, pp. 1-23.

* cited by examiner

*Primary Examiner*—Ted T Vo
(74) *Attorney, Agent, or Firm*—Hickman Palermo Truong & Becker

(57) ABSTRACT

In accordance with one embodiment of the present invention, there is provided a technique for supporting introspection of generic types while maintaining migration compatibility. According to one aspect of this technique, in response to an invocation of a programmatic method of a reflective proxy, a string representation of a program element that corresponds to the reflective proxy is generated. The string representation contains information that is based on formal type parameters that are associated with the declaration of the generic type that is associated with the program element. According to another aspect, the programmatic method described above differs from another existing programmatic method "toString( )" that generates a string representation that does not indicate generic type-specific information. Thus, programs that depend upon the existing implementation of the "toString( )" method may continue to use it. According to one embodiment, the "toString( )" method is unchanged, but a method "toGenericString( )" is also implemented.

12 Claims, 3 Drawing Sheets

INTROSPECTION SUPPORT FOR GENERIC TYPES

BACKGROUND

Java™ Development Kit (JDK) is a software development kit for producing Java™ programming language (referred to as "JPL" herein) programs. JDK version 1.5 introduced several extensions to the JPL. One of these extensions is the introduction of "generic types."

Generic types in JPL are analogous to, but not exactly the same as, templates in the C++ programming language. Generic types may be most easily understood through a discussion of the scenarios that make the use of generic types beneficial.

According to the syntactical rules of strongly typed programming languages such as JPL, the data type of a variable is supposed to be expressed in the declaration of that variable. The following declaration is illustrative:

Integer x=new Integer(0);

In the above declaration, the variable "x" is declared to be of type "Integer." Thus, any attempt to assign, to "x," an object that not an instance of the "Integer" class or a subclass thereof, should be forbidden and should cause the compiler to alert the programmer that something is amiss in the assignment.

The following declaration is somewhat more sophisticated and informative:

List myIntList=new LinkedList( );

In the above declaration, the variable "myIntList" is declared to be of type "List." When the above expression is evaluated, a new instance of the "LinkedList" class (i.e., a "LinkedList" object) is created ("instantiated") via the invocation of the "LinkedList( )" constructor method assigned to "myIntList." The "List" and "LinkedList" classes are used as examples in the discussion below, but it should be understood that the behaviors of the classes discussed below are not limited only to these classes.

Like other variables of type "List," the variable "myIntList" can be assigned "LinkedList" objects. The "LinkedList" object is a linked list of other objects. Prior to the introduction of generic types in JPL, the compiler could not determine what the specific types of these other objects were. The type system was a conservative approximation of run-time behavior. For example, without generic types, if only "Foo"-type objects were "inserted" into a LinkedList, then the compiler could not determine, upon "extraction" of these objects from the LinkedList, that the objects were of type "Foo." Without generic types, the compiler merely could determine that these objects were instances of some indeterminable subtype of the "Object" class; in JPL, all classes are subclasses of the "Object" class. Because this was as specific as the compiler could get, the "extracted" objects could only have the methods of the "Object" class (as opposed to the "Foo" class) invoked relative to them.

Because of this shortcoming, it often became necessary for a programmer to "cast" such a returned object into a particular data type prior to assigning that object to a variable that was declared to be of the particular data type. The following code is demonstrative:

Integer x=(Integer) myIntList.iterator( ).next( );

In the above code, the "Object" type object returned by the method is expressly cast into an instance of class "Integer." If this cast were not performed, then the compiler might complain that a non-"Integer" type object was being assigned to a variable of type "Integer." Indeed, such a complaint would be beneficial, because if the compiler did not complain about such an assignment, then the compiled program might exhibit unexpected and unwanted behavior if and when the method returned an object that actually was not an Integer.

Having to cast objects in this manner usually irritates programmers and makes source code undesirably verbose and less readable. Some might even consider casting to be a "dirty" programming practice. Fortunately, the advent of generic types in JPL made casting unnecessary, at least for the purposes discussed above. A sample declaration that incorporates generic types follows:

List<Integer>myIntList=new LinkedList<Integer>( );

This is similar to the non-generically typed declaration above, except that the declaration expressly indicates that the objects within the linked list assigned to "myIntList" are going to be instances of class "Integer." In light of the declaration, the compiler knows that every object returned by the "myIntList.iterator( ).next( )" method is an "Integer" object. The compiler will not complain about the expression Integer x=myIntList.iterator( ).next( );

because the compiler can determine that the object returned by the method must be an "Integer" object, and that variable "x" can reference objects of type "Integer." A single declaration makes potentially many casts unnecessary.

It is also should be noted that generic types allow for specificity in this manner without requiring multiple separate implementations of the class. Although "myIntList" is a "List" object that references "Integer" objects, it was not necessary for the programmer to specifically code an implementation of the "List" class to reference only "Integer" objects. Generic types allow a class to be defined once in a generic manner, and then invoked multiple times in different specific declarations.

Due to the more precise approximation of run-time behavior that generic types provide, generic types also help to avoid runtime failures.

An actual example of generic type declarations is shown below:

public interface List<E> {
void add(E x);
Iterator<E>iterator( );
}
public interface Iterator<E> {
E next( );
boolean hasNext( );
}

In the above generic type declarations, the angle bracket-enclosed parameters (e.g., "<E>") are called the "formal type parameters" of the generic types. The specific invocation of such a generic type is called a "parameterized type." For example, the following expression is a parameterized type:

List<Integer>

In the foregoing parameterized type, "<Integer>" is an example of an "actual type argument." Parameterized types specify actual type arguments that are to be put in the place of formal type parameters when the generic type declaration is invoked. Although examples provided below contain only one formal type parameters and only one actual type argument, it should be understood that generic type declarations may specify multiple formal type parameters, and parameterized types may specify multiple actual type arguments.

Although JPL generic types and C++ templates are somewhat similar syntactically and functionally, there are some significant differences between the two. The declaration of a JPL generic type is not expanded, neither within source code nor within binary code, into multiple different specific declarations for different actual type arguments. Instead, much like with non-generic type declarations in JPL, a JPL generic type declaration is compiled into a single class file.

Because generic types are so useful, many of the non-generic type declarations that used to exist in the JPL libraries have been replaced with generic type declarations. Non-generic method declarations also have been replaced in these libraries with generic method declarations. In other words, the former non-generic type and method declarations have been "generified." The existing libraries have been generified in a way that allows migration compatibility. Programmers who are writing new JPL programs can make use of the generic types and methods by putting parameterized types in their programs.

It is often useful for a program to have a way of determining, at run time, characteristics of objects that have been instantiated. The ability to determine such characteristics is called "introspection." The JPL Core Reflection Application Programming Interface (API) supports introspection about the classes and objects in the current JPL Virtual Machine (JVM). The JPL Core Reflection API can be used to construct new class instances and new arrays, access and modify fields of objects and classes, invoke methods on objects and classes, and access and modify elements of arrays. The mechanisms of the JPL Core Reflection API allow certain program elements (e.g., classes, fields, methods, etc.) to have a corresponding "reflective proxy" that indicates information about those program elements.

Among the methods provided by the JPL Core Reflection API is the "toString( )" method. The "toString( )" method returns a string representation of a reflective proxy object relative to which the method was invoked. For example, the following code returns a string representation of the "f" field of a reflexive proxy corresponding to the class of object "myObject":

myObject.getClass( ).getField("f").toString( );

All classes inherit the "toString( )" method from the Object class. However, a class may override the "toString( )" method to provide a specialized implementation of the method that produces information that is meaningful to that class in particular.

The "toString( )" method existed before the introduction of generic types to the JPL. As a result, many existing JPL programs use the "toString( )" method, but are not "aware" of generic types. The behavior of these existing programs is sometimes dependent upon the results produced by the "toString( )" method. If the "toString( )" method were modified to produce information that differed from the information expected by an existing program, then it might cause the existing program to malfunction.

For example, an older program might contain ungenerified code such as follows:

Cc=new C( );
c.getClass( ).getField("f").toString( );

Meanwhile, a newer JPL library might declare the "f" field of the "C" class in a generic fashion, such as:

class C {
List<String>f;
}

In the above example, even though "f" is declared to be of generic type "List<String>," the string representation of "f" that is returned by the current specialized implementation of "toString( )" does not contain any generic type-specific information about "List<String>"; for example, the string representation does not say anything about the "List" type having a formal type parameter "<String>." Because it might have been created before the introduction of generic types into the JPL, the program containing the "c.getClass( ).getField("f") .toString( )" code might malfunction if the string representation returned by "toString( )" contained any such generic type-specific information. At the time the program was created, class "C" might have declared field "f" to be of a non-generic "List" type, so the program might not expect the string representation to contain such information.

Thus, there is not currently any method in the JPL Core Reflection API that can generate a string representation that indicates generic type-specific information about a reflective proxy that corresponds to a program element that is of a generic type or that contains a field that is of a generic type. Furthermore, altering "toString( )" could cause some existing programs to behave erratically.

SUMMARY

In accordance with one embodiment of the present invention, there is provided a technique for supporting introspection relative to generic types while preserving the behavior of existing programmatic methods that are "unaware" of generic types.

In one embodiment, in response to the invocation, relative to a reflective proxy, of a programmatic method other than "toString( )," a string representation of a program element to which the reflective proxy object corresponds is generated. The string representation indicates information that is based on one or more formal type parameters that are associated with the declaration of the generic type that is associated with the program element.

In one embodiment, this programmatic method is called "toGenericString( )" in order to distinguish the programmatic method from the existing "toString( )," whose non-generic behavior is already well established and expected. Because "toGenericString( )" differs from "toString( )," new programs may be written to take advantage of the enhanced generic type features of "toGenericString( )" while old programs that cannot deal with these enhanced features may continue to use the existing "toString( )."

Additionally, in one embodiment, "toGenericString( )" behaves the same as "toString( )" in the absence of available generic type information. Thus, "toGenericString( )" may supplant "toString( )" entirely—there is no need to use "toString( )" with non-generic types.

DETAILED DESCRIPTION OF EMBODIMENT(S)

Overview

In accordance with one embodiment of the present invention, techniques are provided for supporting introspection of instances of generic types. An operational flow diagram, which illustrates a high level overview of the operation of one embodiment of the present invention, is shown in FIG. 1.

Figure 1:
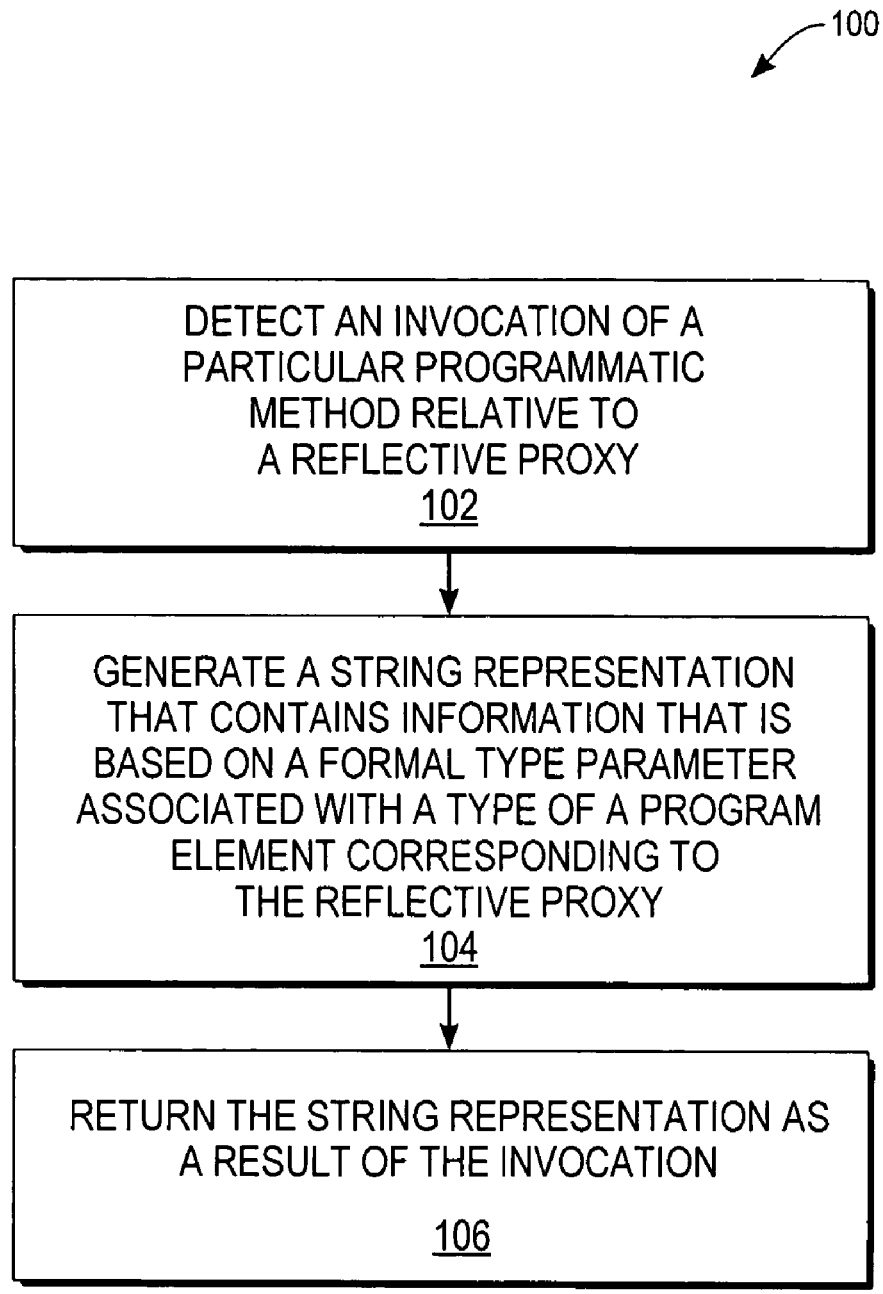
FIG. 1 is a flow diagram that illustrates an overview of the operation of an embodiment of the present invention.

Referring to FIG. 1, in block 102, an invocation of a particular programmatic method relative to a reflective proxy is detected. For example, a JVM may detect the invocation of a programmatic method "toGenericString( )" relative to a reflective proxy that corresponds to a field "f" in code such as:

c.getClass( ).getField("f").toGenericString( );

In block 104, in response to the invocation, a string representation of a program element that corresponds to the reflective proxy is generated. The string representation contains information that is based on one or more formal type parameters that are associated with the program element. Continuing the above example, the type of field "f" might be a generified version of the "List" type. The declaration of a class containing field "f" might have been as follows, for example:

class C {
List<String>f;
}

In the above example, the string representation of field "f" would indicate characteristics such as a name of a generic type, and the formal type parameters of the generic type. For example, the string representation of field "f" would include the string "List<String>C.f." In this string representation, "<String>" indicates the formal type parameter that is associated with the generic type of field "f."

In block 106, the string representation is returned as a result of the invocation. Continuing the example, the string representation including the string "List<String>C.f" might be returned as the results of the invocation:

c.getClass( ).getField("f").toGenericString( ).

In other aspects, the invention encompasses, in certain embodiments, computer apparatuses, computing systems, and computer-readable media configured to carry out the foregoing technique.

Figure 2:
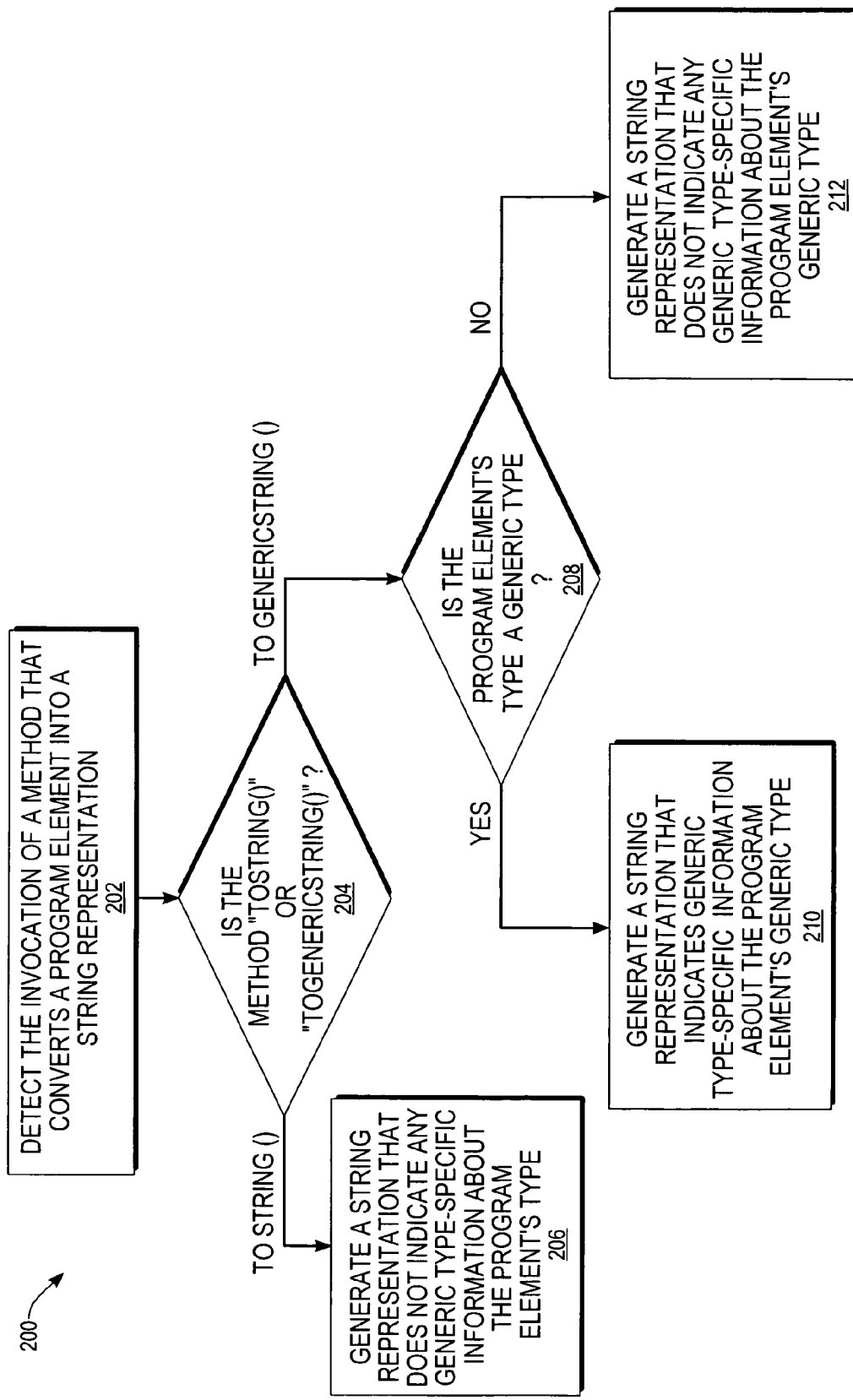
FIG. 2 is a flow diagram that illustrates an example technique for generating a string representation that indicates generic type-specific information, according to an embodiment of the present invention.

Generating String Representations of Program Elements Associated with Generic Types FIG. 2 is a flow diagram that illustrates an example technique for generating a string representation of a program element that may be associated with a generic type, according to an embodiment of the present invention. For example, the JVM may perform such a technique at run time. Although the steps of the technique are shown as being in a particular order for purposes of illustration, the steps of the technique may be performed in orders other than the particular order shown in this example.

According to one aspect of the technique, two separate methods are provided: the existing method "toString( )" and the method "toGenericString( )." Method "toString( )" preserves compatibility with older code that uses this method, while method "toGenericString( )" provides enhanced features when invoked relative to program elements that are associated with generic types.

Referring to FIG. 2, in block 202, the invocation of a method that converts a program element into a string representation of that program element is detected. For example, a JVM may detect that a current instruction in a program contains an invocation of either "toString( )" or "toGenericString( )."

In block 204, it is determined whether the method is "toString( )" or "toGenericString( )." For example, the JVM may make such a determination. If the method is "toString( )," then control passes to block 206. Alternatively, if the method is "toGenericString( )," then control passes to block 208.

In block 206, in response to a determination that the method "toString( )" has been invoked, a string representation of the program element that corresponds to the reflective proxy relative to which the method has been invoked is generated. The string representation does not indicate any generic type-specific information such as one or more formal type arguments that may be indicated in the declaration of the program element's type. The string representation produced by method "toString( )" is the same as would be produced by method "toString( )" prior to the present invention. The JVM may generate such a string representation, for example.

In one embodiment, if "toString( )" is invoked relative to an reflective proxy that corresponds to a program element that is associated with a generic type, the string representation represents the "erased" version of the program element. Typically (but not always), in such an erased version, any generic return types are replaced with a return type of "Object." For example, if "toString( )" was invoked relative to a reflective proxy that corresponded to a method object with a return type "E," where "<E>" was a formal type parameter of the class/interface containing the method, then the string representation might indicate a return type of "Object" rather than "E."

Method "toGenericString( )" can be invoked relative to reflective proxy that corresponds either to a program element that is associated with a generic type or to a program element that is not associated with a non-generic type. Therefore, in block 208, in response to a determination that the method "toGenericString( )" has been invoked, it is determined whether the program element that corresponds to the reflective proxy relative to which the method has been invoked is associated with a generic type. For example, if field "f" was declared to be of class/interface "List<String>," then one or more mechanisms determine that "f" is associated with a generic type. Alternatively, if "f" was declared to be of class/interface "List," then one or more mechanisms determine that "f" is not associated with a generic type. If the program element is associated with a generic type, then control passes to block 210. Otherwise, control passes to block 212.

In block 210, in response to a determination that the program element is associated with a generic type, a string representation of the program element that corresponds to the reflective proxy relative to which the method has been invoked is generated. In this case, the string representation indicates generic type-specific information such as one or more formal type arguments that are indicated in the declaration of the program element's type. In one embodiment, the string representation produced by method "toGenericString( )" is the same as would be produced by method "toStringo," except that the string representation generated by "toGenericString( )" also indicates the generic type-specific information. The JVM may generate such a string representation, for example.

For example, in response to the invocation "c.getClass( ).getField("f") .toGenericString( )," the JVM may generate a string representation of field "f" that indicates the formal type parameter that is indicated in the declaration of the type of field "f": "List<String>."

Alternatively, in block 212, in response to a determination that the program element is not associated with a generic type, a string representation of the program element that corresponds to the reflective proxy relative to which the method has been invoked is generated. The string representation does not indicate any generic type-specific information such as a formal type argument. In one embodiment, the string representation produced by method "toGenericString( )" may be the same as would be produced by method "toString( )" prior to the present invention. In one embodiment, the string representation expressly indicates the absence of such generic type-specific information.

Hardware Overview

Figure 3:
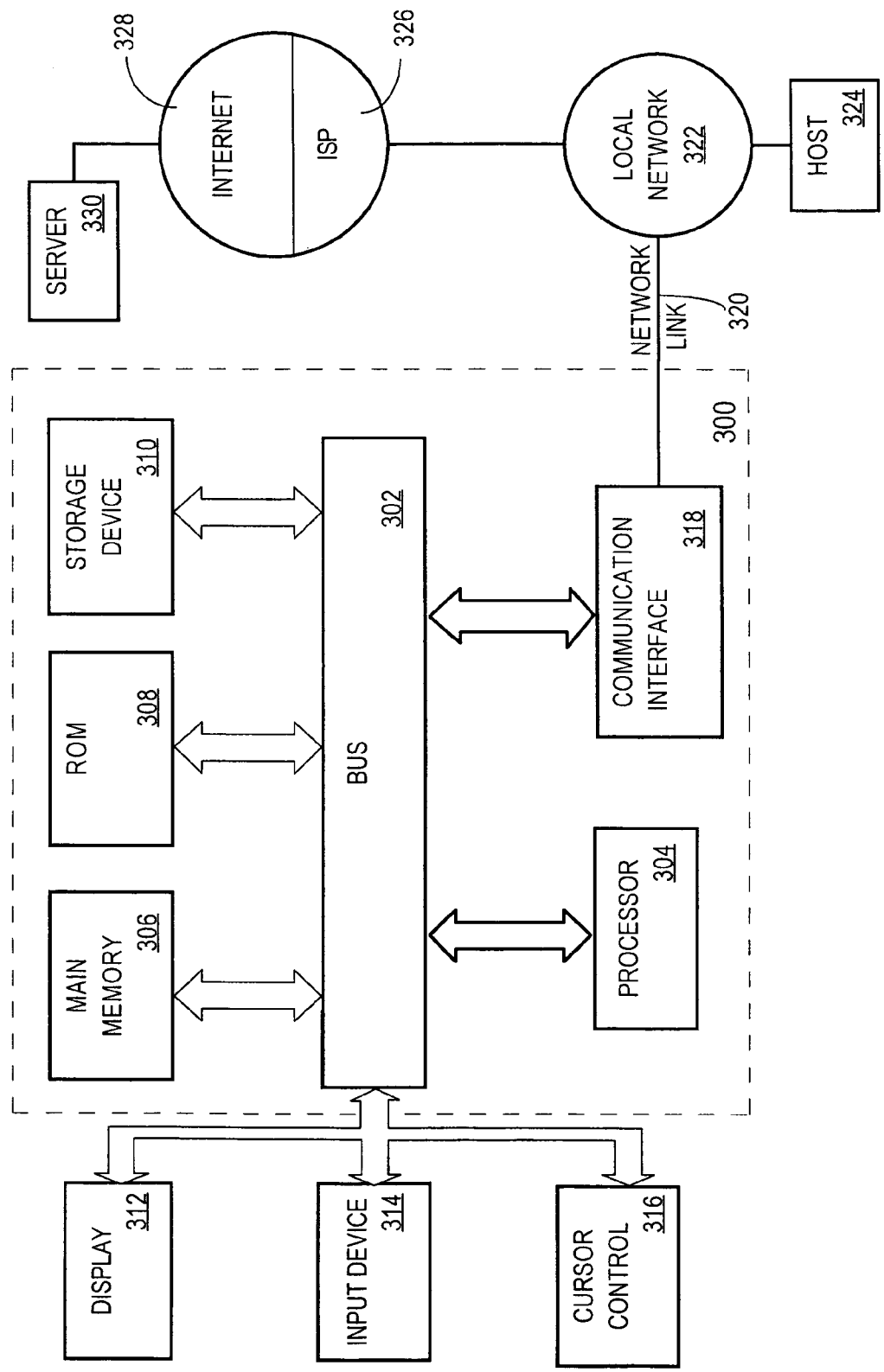
FIG. 3 is a hardware block diagram of an example computer entity, upon which certain embodiments of the invention may be implemented.

FIG. 3 is a block diagram that illustrates a computer system 300 upon which an embodiment of the invention may be implemented. Computer system 300 includes a bus 302 for facilitating information exchange, and one or more processors 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions by processor 304. Computer system 300 may further include a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

In computer system 300, bus 302 may be any mechanism and/or medium that enables information, signals, data, etc., to be exchanged between the various components. For example, bus 302 may be a set of conductors that carries electrical signals. Bus 302 may also be a wireless medium (e.g. air) that carries wireless signals between one or more of the components. Bus 302 may also be a medium (e.g. air) that enables signals to be capacitively exchanged between one or more of the components. Bus 302 may further be a network connection that connects one or more of the components. Overall, any mechanism and/or medium that enables information, signals, data, etc., to be exchanged between the various components may be used as bus 302.

Bus 302 may also be a combination of these mechanisms/media. For example, processor 304 may communicate with storage device 310 wirelessly. In such a case, the bus 302, from the standpoint of processor 304 and storage device 310, would be a wireless medium, such as air. Further, processor 304 may communicate with ROM 308 capacitively. In this instance, the bus 302 would be the medium (such as air) that enables this capacitive communication to take place. Further, processor 304 may communicate with main memory 306 via a network connection. In this case, the bus 302 would be the network connection. Further, processor 304 may communicate with display 312 via a set of conductors. In this instance, the bus 302 would be the set of conductors. Thus, depending upon how the various components communicate with each other, bus 302 may take on different forms. Bus 302, as shown in FIG. 3, functionally represents all of the mechanisms and/or media that enable information, signals, data, etc., to be exchanged between the various components.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer implemented method for generating information about generic types, the method comprising:
    in response to an invocation of a first programmatic method of a reflective proxy that corresponds to a program element, generating a first string representation of the program element;
    wherein the first string representation contains information that is based on one or more formal type parameters that are associated with a declaration of a generic type that is associated with the program element due to the program element being associated with a generic type;
    storing the first string representation within a memory of a computer; and
    wherein generating the first string representation comprises:
        determining whether the program element is associated with a generic type;
        if the program element is associated with a generic type, then generating a string representation that indicates one or more formal type parameters that are associated with a generic type that is associated with the program element; and
        if the program element is not associated with a generic type, then generating a string representation that indicates the absence of a formal type parameter of a generic type.

2. The method of claim 1, further comprising:
    returning the first string representation as a result of the invocation.

3. The method of claim 1, further comprising:
    in response to an invocation of a second programmatic method of the reflective proxy, generating a second string representation of the program element;
    wherein the second programmatic method differs from the first programmatic method; and
    wherein the second string representation does not contain information that is based on any formal type parameter that is associated with a generic type that is associated with the program element.

4. The method of claim 1, wherein the first string representation of the program element is the same as a string representation that would be returned by programmatic method "toString( )" if programmatic method "toString( )" were invoked relative to the reflective proxy, except that the first string representation additionally indicates the one or more formal type parameters.

5. The method of claim 1, wherein the program element is one of a class, a method, and a field.

6. The method of claim 1, further comprising:
    displaying the first string representation to a user.

7. A volatile or non-volatile computer-readable storage medium carrying one or more sequences of instructions, which instructions, when executed by one or more processors, cause the one or more processors to carry out the steps of:
    in response to an invocation of a first programmatic method of a reflective proxy that corresponds to a program element, generating a first string representation of the program element;
    wherein the first string representation contains information that is based on one or more formal type parameters that are associated with a declaration of a generic type that is associated with the program element, due to the program element being associated with a generic type; and
    storing the first string representation with a memory of a computer;
    wherein generating the first string representation comprises:
        determining whether the program element is associated with a generic type;
        if the program element is associated with a generic type, then generating a string representation that indicates one or more formal type parameters that are associated with a generic type that is associated with the program element; and
        if the program element is not associated with a generic type, then generating a string representation that indicates the absence of a formal type parameter of a generic type.

8. The computer-readable storage medium of claim 7, further comprising instructions for carrying out the step of:
    returning the first string representation as a result of the invocation.

9. The computer-readable storage medium of claim 7, further comprising instructions for carrying out the steps of:
    in response to an invocation of a second programmatic method of the reflective proxy, generating a second string representation of the program element;

wherein the second programmatic method differs from the first programmatic method; and wherein the second string representation does not contain information that is based on any formal type parameter that is associated with a generic type that is associated with the program element.

10. The computer-readable storage medium of claim 7, wherein the first string representation of the program element is the same as a string representation that would be returned by programmatic method "toString( )" if programmatic method "toString( )" were invoked relative to the reflective proxy, except that the first string representation additionally indicates the one or more formal type parameters.

11. The computer-readable storage medium of claim 7, wherein the program element is one of a class, a method, and a field.

12. The computer-readable storage medium of claim 7, wherein the instructions, when executed by one or more processors, further cause the one or more processors to carry out the steps of:

displaying the first string representation to a user.

* * * * *